(12) United States Patent
Lu

(10) Patent No.: US 8,297,052 B2
(45) Date of Patent: Oct. 30, 2012

(54) HYDRAULIC ELECTRICITY GENERATOR

(76) Inventor: Shun-Tsung Lu, Taichung Hsien (TW)

(*) Notice: Subject to any disclaimer, the term of this patent is extended or adjusted under 35 U.S.C. 154(b) by 800 days.

(21) Appl. No.: 12/488,810

(22) Filed: Jun. 22, 2009

(65) Prior Publication Data
US 2010/0320768 A1 Dec. 23, 2010

(51) Int. Cl.
*F03B 13/06* (2006.01)
*F03B 13/08* (2006.01)
(52) U.S. Cl. .......................... 60/398; 290/54
(58) Field of Classification Search .............. 60/398; 290/43, 54, 55
See application file for complete search history.

(56) References Cited

U.S. PATENT DOCUMENTS

| 7,956,485 B1 * | 6/2011 | Simnacher | 290/55 |
| 8,143,740 B1 * | 3/2012 | Simnacher | 290/55 |

FOREIGN PATENT DOCUMENTS

| DE | 3928321 A | * | 2/1990 |
| DE | 4009022 A | * | 10/1990 |
| JP | 2004019626 A | * | 1/2004 |
| JP | 2004092394 A | * | 3/2004 |

* cited by examiner

*Primary Examiner* — Thomas E Lazo
(74) *Attorney, Agent, or Firm* — Apex Juris, pllc; Tracy M. Heims

(57) ABSTRACT

A hydraulic electricity generator has a drive device, a hydro-generator and a recovering tank. The drive device has at least one compressing unit, and each compressing unit has a storage tube and a compressor. The storage tube has a chamber, an inlet pipe, an outlet pipe and a nozzle. The pipes are connected to the storage tube. The compressor is connected to the storage tube. The hydro-generator is connected to the at least one compressing unit and has a casing, a hydraulic turbine, a windmill and a draining pipe. The hydraulic turbine is rotatably mounted in the casing and has a spindle and multiple blades. The spindle has an outer end extended out of the casing. The windmill is mounted on the outer end of the spindle. The recovering tank is connected to the draining pipe of the hydro-generator and the inlet pipe of the drive device.

7 Claims, 4 Drawing Sheets

US 8,297,052 B2

HYDRAULIC ELECTRICITY GENERATOR

BACKGROUND OF THE INVENTION

1. Field of the Invention

The present invention relates to an electricity generator, and more particularly to a multiplex supplied and re-circulated hydraulic electricity generator that can generate electricity in a cycle of operation.

2. Description of Related Art

A conventional hydraulic electricity generator is used to generate power by water and comprises a hydro-generator. The hydro-generator has a body and multiple blades. The body is hollow. The blades are mounted rotatably in the body. When water flows into the body of the hydro-generator and rotates the blades, the rotation of the blades can make the hydro-generator generate electricity.

However, the conventional hydraulic electricity generator needs a lot of water to flow continually into the hydro-generator to rotate the blades for generating electricity. Therefore, the conventional hydraulic electricity generator has to be set up near a water source to supply water into the hydro-generator continuously, so the working range of the conventional hydraulic electricity generator is limited. In addition, when water is not enough for rotating the blades, the hydro-generator will lose the capability to generating electricity.

The hydraulic electricity generator in accordance with the present invention mitigates or obviates the aforementioned problems.

SUMMARY OF THE INVENTION

The main objective of the present invention is to provide a multiplex supplied and re-circulated hydraulic electricity generator that can generate electricity in a cycle of operation.

The hydraulic electricity generator in accordance with the present invention has a drive device, a hydro-generator and a recovering tank. The drive device has at least one compressing unit, and each compressing unit has a storage tube and a compressor. The storage tube has a chamber, an inlet pipe, an outlet pipe and a nozzle. The pipes are connected to the storage tube. The compressor is connected to the storage tube and has a piston. The hydro-generator is connected to the at least one compressing unit of the drive device and has a casing, a hydraulic turbine, a windmill and a draining pipe. The hydraulic turbine is rotatably mounted in the casing and has a spindle and multiple blades. The spindle has an outer end extended out of the casing. The windmill is mounted securely on the outer end of the spindle. The recovering tank is connected to the draining pipe of the hydro-generator and the inlet pipe of the drive device to let water that flows out of the hydro-generator flowing back to the chamber of the storage tube.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
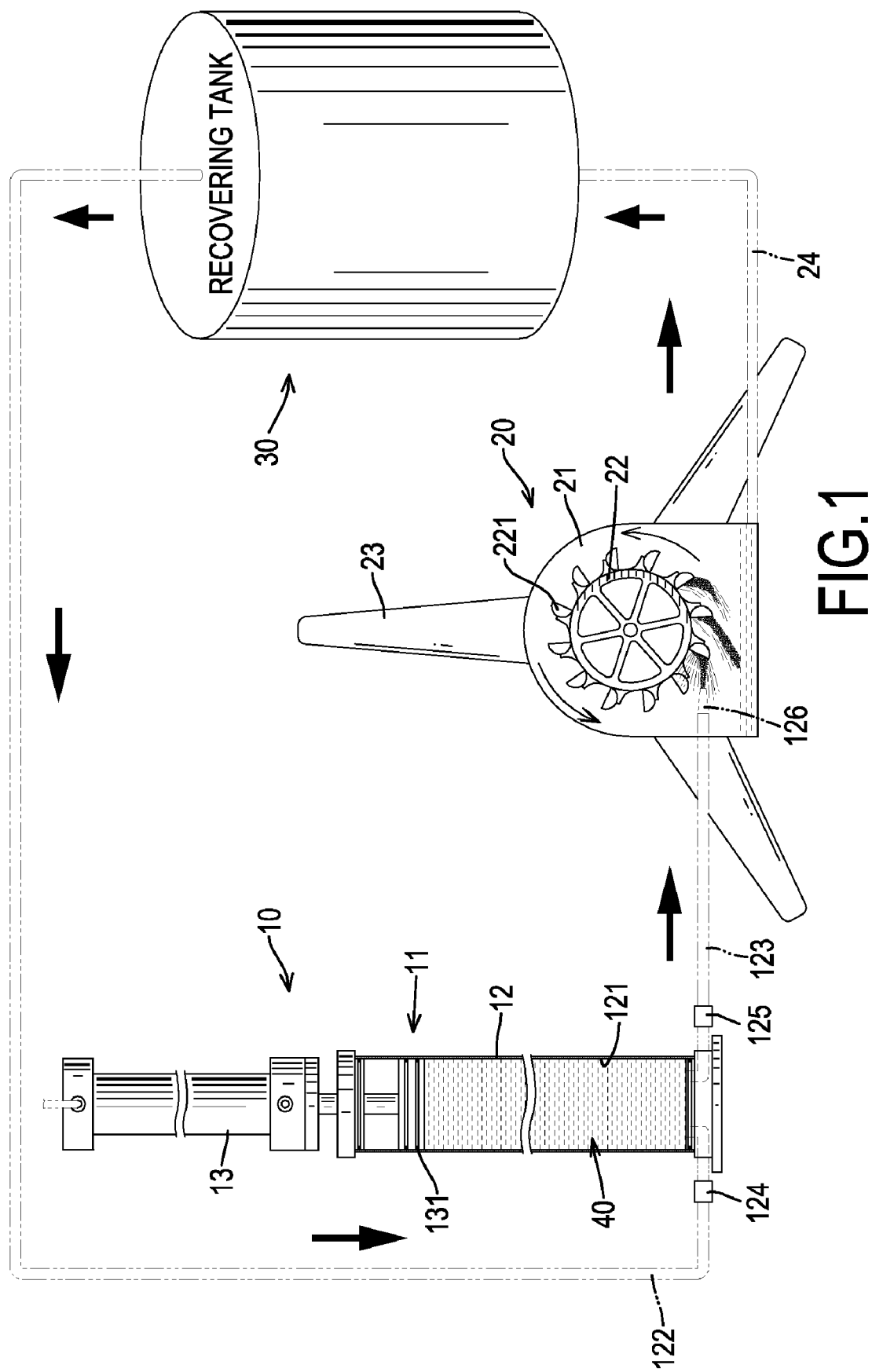
FIG. 1 is an operational side view in partial section of a hydraulic electricity generator in accordance with the present invention.
Figure 2:
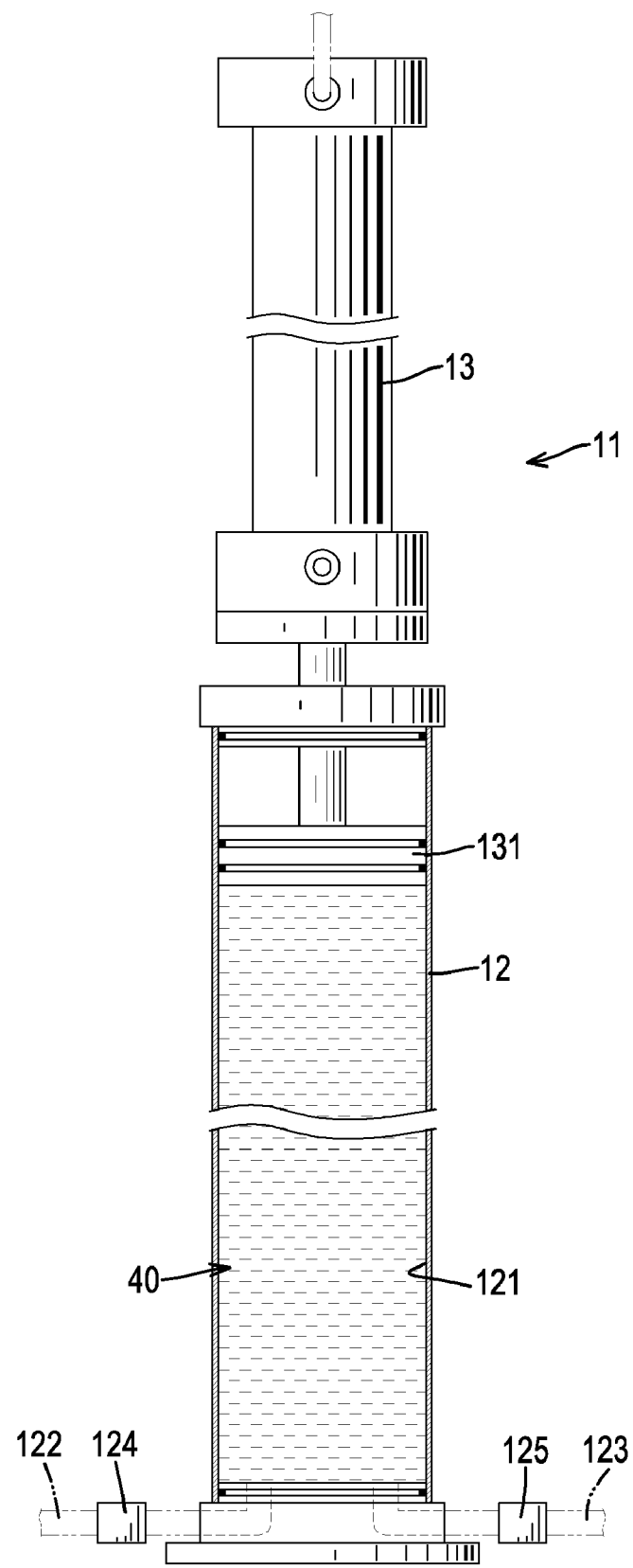
FIG. 2 is an enlarged side view in partial section of a drive device of the hydraulic electricity generator in FIG. 1.
Figure 3:
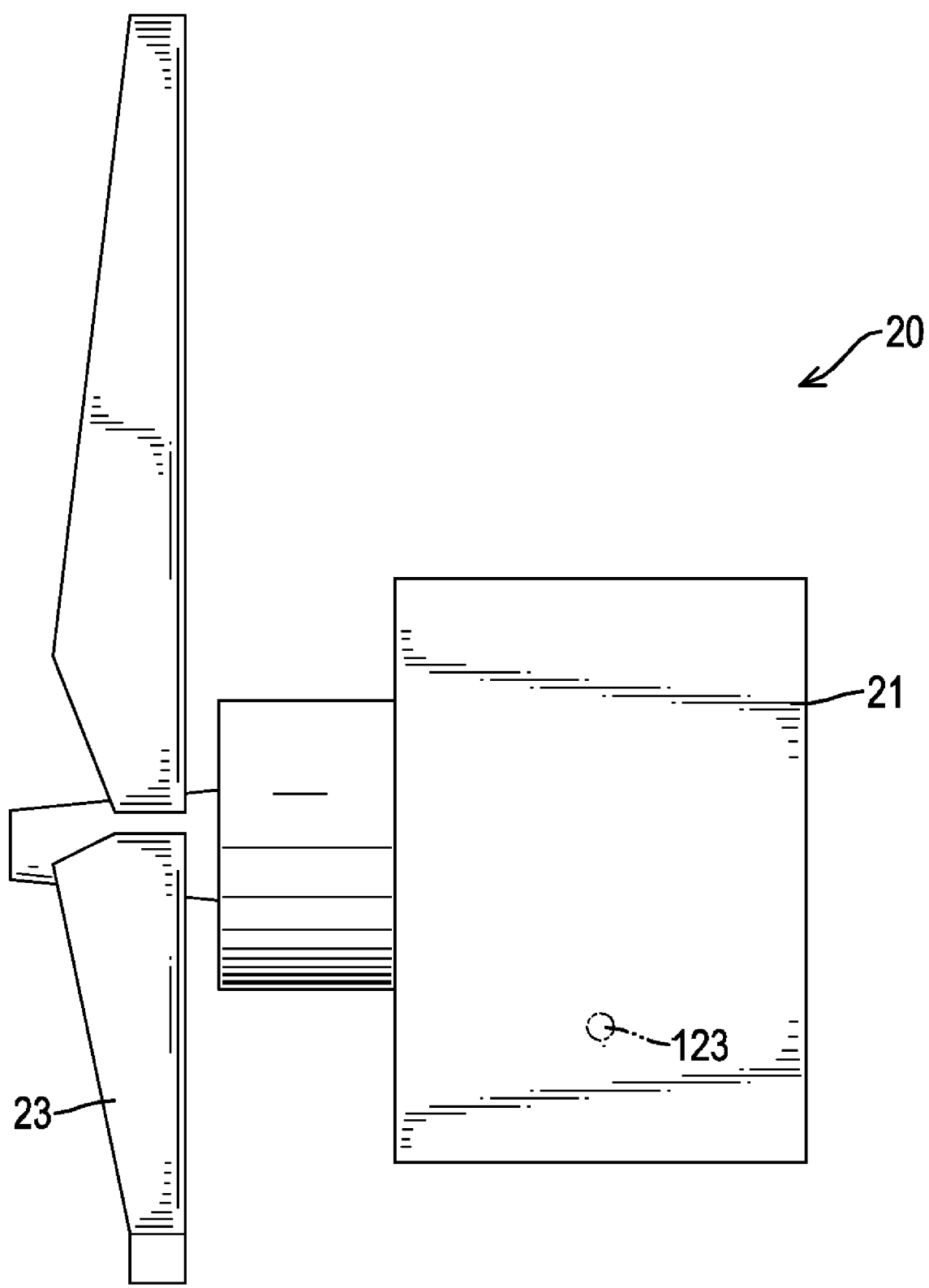
FIG. 3 is an enlarged side view of a hydro-generator of the hydraulic electricity generator in FIG. 1.

With reference to FIGS. 1 to 4, a hydraulic electricity generator in accordance with the present invention comprises a drive device (10), a hydro-generator (20) and a recovering tank (30).

The drive device (10) has at least one or multiple compressing units (11), and each compressing unit has a storage tube (12) and a compressor (13).

The storage tube (12) is hollow and has a top, a bottom, a chamber (121), an inlet pipe (122), an outlet pipe (123) and a nozzle (126). The chamber (121) is defined in the storage tube (12) to storage water (40). The pipes (121, 122) are connected to the storage tube (12) near the bottom and communicate with the chamber (121), and each pipe (121, 122) has a free end and a check valve (124, 125). The check valves (124, 125) are respectively connected to the pipes (121, 122) between free ends and the storage tube (12). The nozzle (126) is mounted on the free end of the outlet pipe (123).

The compressor (13) may be an oil pressure pump, is connected to the top of the storage tube (12) and has a piston (131). The piston (13) is slidably mounted in the chamber (121) of the storage tube (12) to push the water (40) flowing out of the storage tube (12) from the outlet pipe (123).

The hydro-generator (20) is connected to the at least one compressing unit (11) of the drive device (10) and has a casing (21), a hydraulic turbine (22), a windmill and a draining pipe (24).

Figure 4:
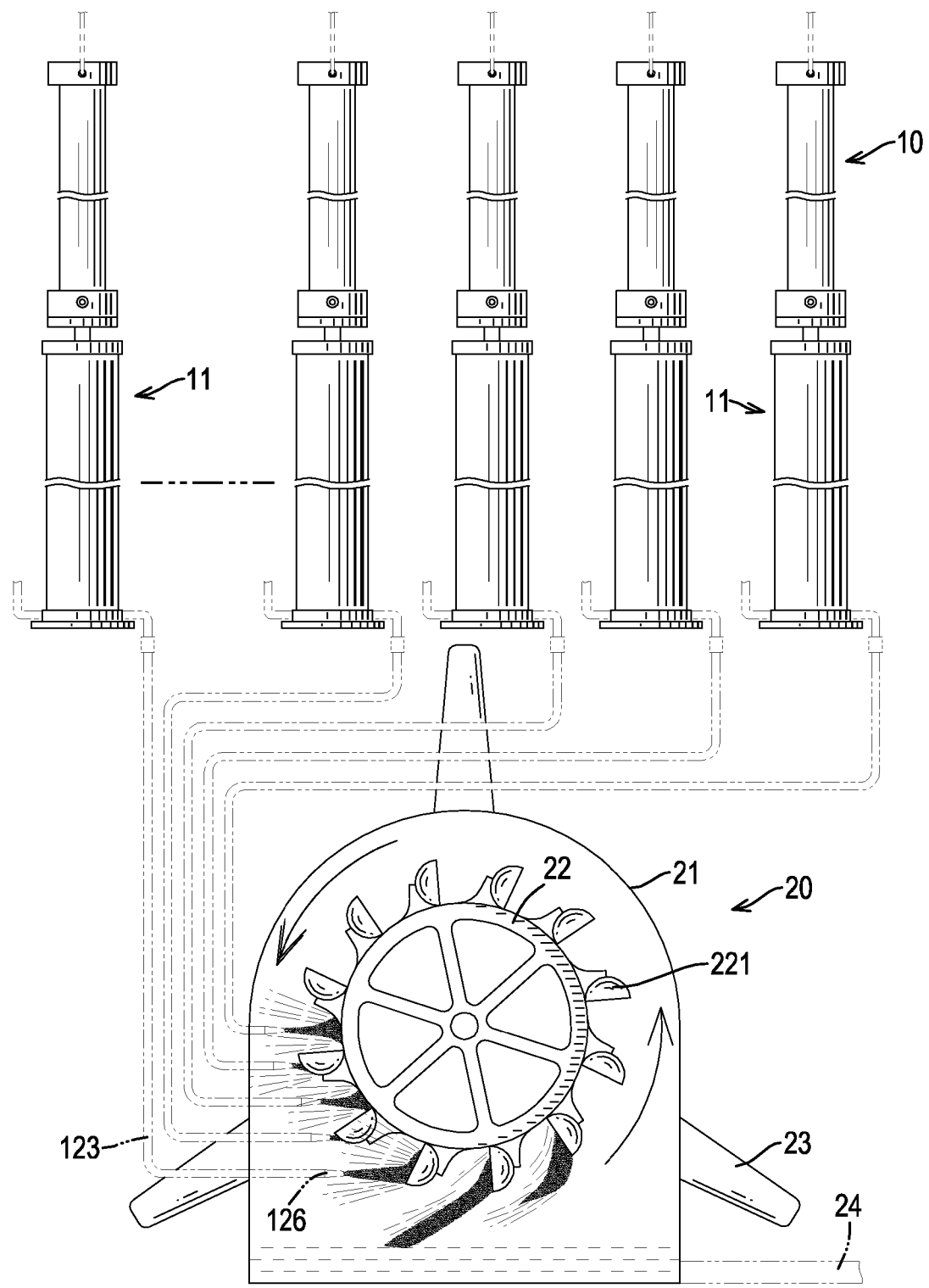
FIG. 4 is an operational side view of another embodiment of a hydraulic electricity generator in accordance with the present invention.

The casing (21) is hollow and has two opposite sides. When multiple compressing units (11) are implemented, the compressing units (11) are connected to the casing (21) of the hydro-generator (20) in parallel as shown in FIG. 4. One of the opposite sides of the casing (21) of the hydro-generator (20) is connected to the free ends of the outlet pipes (123) of the storage tubes (12) of the compressing units (11) and the nozzles (126) are extended into the casing (21) to inject water (40) into the hydro-generator (20) for generating electricity.

The hydraulic turbine (22) is rotatably mounted in the casing (21) and has a spindle and multiple blades (221). The spindle of the hydraulic turbine (22) is rotatably mounted in the casing (21) and has an outer end extended out of the casing (21). The blades (221) are formed around the spindle of the hydraulic turbine (22), each blade (221) may be semicircular and the nozzles (126) of the storage tubes (12) can inject water (40) onto the blades (221) to rotate the spindle of the hydraulic turbine (22) for generating electricity.

The windmill (23) is mounted securely on the outer end of the spindle of the hydraulic turbine (22) to provide another force to rotate the spindle of the hydraulic turbine (20) with wind power.

The draining pipe (24) is connected to the other opposite side of the casing (21) of the hydro-generator (20) to allow the water (40) flowing out of the hydro-generator (20).

The recovering tank (30) is connected to the draining pipe (24) of the hydro-generator (20) and the inlet pipe (122) of the drive device (10) to let water (40) that flows out of the hydro-generator (20) flow back to the chamber (121) of the storage tube (12) of the at least one compressing unit (11).

With reference to FIGS. 1 and 4, when the pistons (13) are driven to move inward relative to the storage tubes (12), the water (40) in the chambers (121) of the storage tubes (12) will be injected into the hydro-generator (20) via the outlet pipes (123) and the nozzles (126) and onto the blades (221) to rotate the hydraulic turbine (22) and generate electricity. When the hydro-generator (20) generates electricity with the water (40) provided from the drive device (10), the water (40) will flow out of the hydro-generator (20) and into the recovering tank (30) via the draining pipe (21). When the pistons (13) are moved outward relative to the storage tubes (12), the water (40) in the recovering tank (30) will flow into the chambers (121) of the storage tubes (12) via the inlet pipes (122). Thus, the hydraulic electricity generator in accordance with the present invention can generate electricity continuously and is not limited to be set up at a location near a water source. In addition, the hydraulic turbine can also be rotated to generate electricity by the windmill (23) on the spindle of the hydraulic turbine (22) with the wind power, so electricity generator in accordance with the present invention has multiplex power supplies and is versatile in use.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hydraulic electricity generator having
    a drive device having at least one compressing unit, and each one of the at least one compressing unit having
        a storage tube having
            a top;
            a bottom;
            a chamber defined in the storage tube to store water;
            an inlet pipe connected to the storage tube near the bottom, communicating with the chamber and having a free end;
            an outlet pipe connected to the storage tube near the bottom, communicating with the chamber and having a free end; and
            a nozzle mounted on the free end of the outlet pipe; and
        a compressor connected to the top of the storage tube and having a piston slidably mounted in the chamber of the storage tube to push the water flowing out of the storage tube from the outlet pipe;
    a hydro-generator connected to the at least one compressing unit of the drive device and having
        a hollow casing having two opposite sides, and one of the opposite sides of the casing connected to the free end of the outlet pipe of the storage tube of the at least one compressing unit, wherein the nozzle of each one of the at least one compressing units is extended into the casing to inject the water into the hydro-generator to generate electricity;
        a hydraulic turbine rotatably mounted in the casing and having
            a spindle rotatably mounted in the casing and having an outer end extended out of the casing; and
            multiple blades formed around the spindle of the hydraulic turbine;
        a windmill mounted securely on the outer end of the spindle of the hydraulic turbine to provide another rotating force to the hydraulic turbine; and
        a draining pipe connected to the other opposite side of the casing of the hydro-generator to allow the water flowing out of the hydro-generator; and
    a recovering tank connected to the draining pipe of the hydro-generator and the inlet pipe of the at least one compressing unit of the drive device to let the water that flows out of the hydro-generator flow back to the chamber of the storage tube of the at least one compressing unit.

2. The hydraulic electricity generator as claimed in claim 1, wherein the drive device has multiple compressing units connected to the hydro-generator and the recovering tank.

3. The hydraulic electricity generator as claimed in claim 2, wherein each pipe of the storage tube of each compressing unit has a check valve connected to the pipe between the free end of the pipe and the storage tube.

4. The hydraulic electricity generator as claimed in claim 3, wherein the compressor of each compressing unit is an oil pressure pump.

5. The hydraulic electricity generator as claimed in claim 4, wherein each blade of the hydraulic turbine is semicircular.

6. The hydraulic electricity generator as claimed in claim 1, wherein the compressor of each one of the at least one compressing unit is an oil pressure pump.

7. The hydraulic electricity generator as claimed in claim 1, wherein each blade of the hydraulic turbine is semicircular.

* * * * *